United States Patent [19]

Hill

[11] 4,189,700

[45] Feb. 19, 1980

[54] RESISTOR DEVICE

[75] Inventor: David C. Hill, Attleboro, Mass.

[73] Assignee: Texas Instruments Incorporated, Dallas, Tex.

[21] Appl. No.: 904,681

[22] Filed: May 10, 1978

Related U.S. Application Data

[62] Division of Ser. No. 721,729, Sep. 9, 1976.

[51] Int. Cl.² .............................................. H01C 7/00
[52] U.S. Cl. ..................................... 338/333; 29/612; 219/541; 219/553; 338/22 SD; 338/324; 338/327
[58] Field of Search ................ 338/22 R, 22 SD, 333, 338/324, 327; 219/505, 553; 29/621, 611, 610, 612

[56] References Cited

U.S. PATENT DOCUMENTS 4,107,515  8/1978  Kulwicki .............................. 219/541

*Primary Examiner*—C. L. Albritton

*Attorney, Agent, or Firm*—John A. Haug; James P. McAndrews

[57] ABSTRACT

A body of ceramic material of positive temperature coefficient of resistivity is molded so that a plurality of passages extend between opposite ends of the body. In molding the body, lands or abutments of resistor material are formed around the ends of alternate body passages at one end of the body and around the ends of the other passages at the opposite end of the body. A band of masking material is applied to the sides of the body and the body is then immersed in a coating bath for simultaneously coating the inner walls of the body passages, the ends of the body, and the unmasked bands of the body side surface with an electrically conductive ohmic contact material. Preferably, the ohmic contact and masking materials are selected to be impervious to reducing atmospheres and the ends of the body are treated for coating at least the unmasked bands of the body side surfaces with a material characterized by low electrical contact resistance. Thereafter, the outer ends of the abutments are abraded for removing coating materials from the ends of the abutments.

12 Claims, 9 Drawing Figures

RESISTOR DEVICE

This is a division, of application Ser. No. 721,729, filed Sept. 9, 1976.

It has been proposed in a commonly assigned, co-pending application for patent, Ser. No. 721,727, now U.S. Pat. No. 4,107,515 filed of even date herewith, that a compact rugged resistor device can comprise a body of ceramic material of positive temperature coefficient of resistivity having a plurality of passages extending in a pattern in spaced side-by-side relation to each other between opposite ends of the body. A coating of electrically conductive material is secured to the inner walls of the body passages in ohmic contact with the resistor material. The coatings in alternate passages are interconnected at one end of the body to serve as one device terminal while the coatings in the other passages are interconnected at the opposite end of the body to serve as the second device terminal. This proposed resistor device has a number of advantages when used as a bistable current limiter or as a self-regulating fluid heater. That is, when the device terminals are connected in an electrical circuit, current is directed through thin webs of resistor material located between ohmic contacts in adjacent body passages. Where these webs are very thin, the device displays low room temperature resistance even though the resistor body incorporates conventional PTC materials. However, because a large number of passage coatings are connected to each device terminal, the device has a large effective ohmic contact area and is adapted to carry a substantial current load while maintaining low current density in the webs of resistor material between adjacent body passages. On the other hand, if the device tends to heat up to an excessive degree, resistivity of the device material increases in a desired manner for limiting self-heating of the device to safe levels. Further, the device is substantially free of undesirable effects resulting from temperature and resistivity gradients in the device and serves as a more efficient fluid heater than previously known PTC heaters.

However, it has been found that the proposed resistor devices are primarily useful in applications where the cost of the resistor device is a major factor. Accordingly, it would be desirable to provide a method for making the devices which is particularly adapted for mass producing the devices with high reliability at low cost. It would also be desirable to provide such devices which are adapted to display long service lives in harsh environments.

It is an object of this invention to provide a novel and improved resistor device of a compact rugged structure; to provide such a device which is adapted to display a long service life; to provide novel and improved methods for making such devices; to provide such improved methods which are especially adapted for mass producing the devices at low cost; and to provide such methods which produce such devices with consistently uniform mechanical and electrical characteristics.

Briefly described, in the novel and improved methods of this invention, a body of a ceramic resistor material or the like of positive temperature coefficient of resistivity is provided with a plurality of passages extending in a pattern in spaced side-by-side relation to each other through the body between opposite end surfaces of the body. In accordance with this invention, the body is also provided with lands or abutments of the resistor material which extend around the ends of alternate ones of the body passages at one end surface of the body and with lands or abutments of the resistor material which extend around the ends of the other body passages at the opposite end surface of the body. Such a resistor body is conveniently and economically formed by injection molding, or slip casting or the like in a conventional manner. In a preferred embodiment of the method of this invention, a band of masking or resist material is applied to the body extending circumferentially around the sides of the body. In this arrangement, the ends of the body are left free of masking material. Preferably, a band of the body side surface extending around the body adjacent each end of the body is also left free of masking material. The partially masked body is then immersed in a suitable coating bath for coating all unmasked surfaces of the body including the inner walls of the body passages, the end surfaces of the body, and the unmasked bands of the body side surface with an electrically conductive material. At least the coatings in the body passages are in ohmic contact relation to the resistor material. The masking materials and coating bath are selected in a conventional manner with respect to the resistor body material to form the desired coatings and usually the coatings are subjected to a conventional heat treatment for securing the coating material in ohmic contact relation to the resistor material. Preferably the masking material comprises a silicone rubber or the like which is impervious to reducing atmospheres and the like for protecting the masked portions of the resistor material against degradation in such atmospheres. Preferably also the electrically conductive coating comprises nickel metal or the like which is impervious to reducing atmospheres and the like for protecting the coated portions of the resistor material against degradation in such atmospheres. If desired at least the ends of the masked and coated body are immersed in an additional coating bath for coating at least the unmasked bands of the body side surface with a material such as silver characterized by low electrical contact resistance. In this preferred embodiment of the invention, the outer ends of the abutments at the opposite ends of the body are then abraded for removing coating material from the outer ends of the abutments.

In the convenient and economical process as above described, ohmic contacts are formed within the body passages and are simultaneously interconnected by electrically conductive coatings formed on the body end surfaces around the abutments so that, after the abrading step, the contacts in alternate body passages are connected together only at one end of the body while the contacts in the other body passages are connected together only at the opposite end of the body. In this way, each group of interconnected ohmic contacts serves as one device terminal so that, when the terminals are connected in an electrical circuit, current is directed through a plurality of webs of the resistor material located between adjacent ohmic contacts within the resistor body. The electrically conductive coatings which interconnect groups of the ohmic contacts at the ends of the resistor body extend around the sides of the resistor body abutments and are therefore protected by the abutments against inadvertent scratching or other injury. Further, the contact interconnection means at the body ends are also electrically connected to the bands of electrically conductive material formed around the sides of the body adjacent the body ends, and these bands are preferably coated with a low contact resistance material such as silver to facilitate connecting the device terminals in an electrical circuit. Where the masking and ohmic contact materials are selected to be impervious to reducing atmospheres and the like, substantially all of the PTC resistor material is protected against degradation of the PTC material in such atmospheres so that the device has wide application in different environments over a long service life.

In another preferred embodiment of this invention, the resistor body as initially molded is covered with the above noted band of masking material extending around the sides of the body and, in addition, the masking material is applied to the outer ends of each of the resistor body abutments. Then, when the partially masked body is immersed in the bath of ohmic contact material, coatings are formed on the inner walls of the body passages and are interconnected in the noted groups at opposite ends of the resistor body during the immersion step without requiring abrading of the outer ends of the abutments.

Other objects, advantages and details of the improved devices and methods of this invention appear in the following detailed description of preferred embodiments of the invention, the detailed description referring to the drawings in which.

DESCRIPTION OF THE EMBODIMENTS

Figure 1:
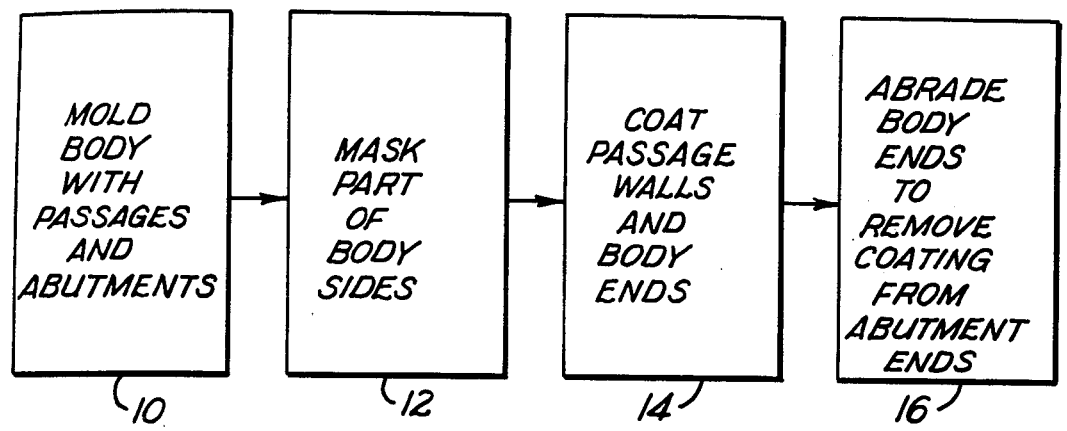
FIG. 1 is a block diagram illustrating a preferred embodiment of the method of this invention.

Referring to the drawings, FIG. 1 diagrammatically illustrates the novel and improved method for making resistor devices provided by this invention. The method preferably comprises the steps shown in FIG. 1 including the molding of a resistor body as indicated at 10 in FIG. 1, the masking of a part of this molded body as indicated at 12 in FIG. 1, the coating of unmasked portions of the molded body as indicated at 14 in FIG. 1, and the abrading of selected coated portions of the body as indicated at 16 in FIG. 1. Each of these method steps is easily and economically performed as is more fully described below and accordingly the method provided by the invention is particularly adapted for use in mass producing the desired resistor devices at low cost.

Figure 2:
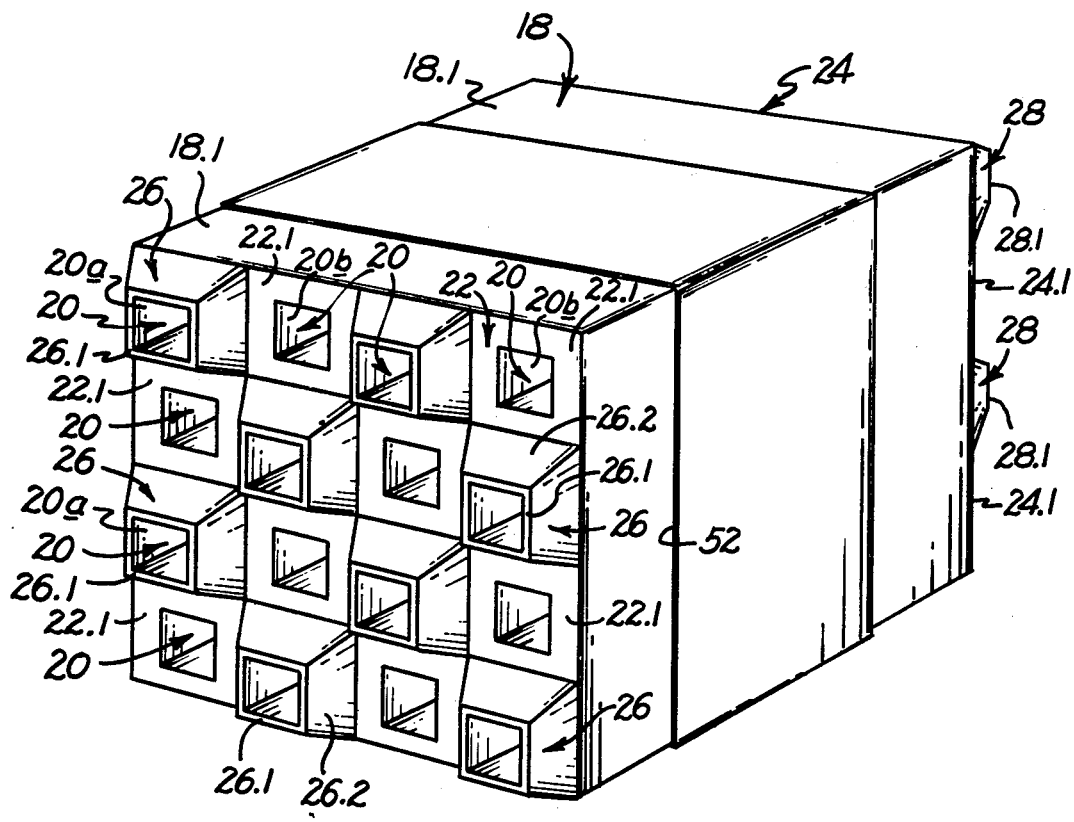
FIG. 2 is a perspective view of the resistor body incorporated in the resistor device of this invention.

Thus, as shown in FIG. 2, the resistor device of this invention comprises a body 18 formed of a resistor material having a positive temperature coefficient of resistivity. Preferably, for example, the body 18 is formed of a ceramic resistor material such as a lanthanum-doped barium titanate or the like which is adapted to display a sharp, anomalous increase in resistivity when heated to a selected temperature. However, other resistor materials of positive temperature coefficient of resistivity (PTC) are also used within the scope of this invention. Typically, for example, the body 18 is formed of a ceramic titanate having the empirical formula $Ba_{.968} Pb_{.030} La_{.002} Ti O_3$ which has a room temperature resistivity of about 36 ohm centimeters and a Curie temperature of about 140° C. and which is adapted to display a sharp, anomalous increase in resistivity to about $10^5$ ohm-centimeters when heated above its anomaly temperature to about 200° C. As such PTC resistor materials are well-known, they are not further described herein and it will be understood that the body 18 is formed of any of the various well-known PTC resistor materials within the scope of this invention.

In accordance with this invention, the resistor body 18 is formed with a plurality of passages 20 extending in a pattern in spaced, generally parallel, side-by-side relation to each other through the body between opposite ends 22 and 24 of the body. In forming the body, lands or abutments 26 of the resistor material are provided around the ends of alternate ones 20a of the body passages at one body end 22 while similar lands or abutments of the resistor material are provided around the ends of the other passages 20b at the opposite end 24 of the body. That is, curb-like abutments or parapets are provided standing out from the end surfaces of the body around the margins of some of the passages at one end of the body and around the margins of other passages at the opposite end of the body. In this arrangement, as shown in FIG. 2, the tops of outer ends 26.1 of the abutments, lands or parapets 26 are separated from each other at the body end 22 and are preferably disposed in a common plane spaced outwardly from other portions of the body end surface including the side portions 26.2 of the abutments and the portions 22.1 of the body end surface which surround the ends of the other passages 20b. Similarly, the tops or outer ends 28.1 of the abutments or parapets 28 are separated from each other in a common plane spaced outwardly from the other portions 24.1 and 28.2 of the opposite end surface of the body.

The body 18 is easily and economically provided with the configuration above-described by injection molding or in any other conventional manner within the scope of this invention. For example, as is diagrammatically illustrated in FIG. 3, injection mold halves 30 and 32 are fitted together at 34 and resistor body material is injected into the mold chamber as indicated by arrow 36 while the chamber is vented as indicated by arrow 38, the rods 40 and 42 on the respective mold halves forming the body passages 20 and the recesses 44 and 46 on the mold halves forming the abutments 26 and 28. The body 18 is then removed by separating the mold halves as indicated by the arrows 48. Typically, for example, where the resistor body is to be formed of a ceramic titanate material, the titanate material is injected into the mold in particulate form together with a suitable organic binder or the like in the manner conventionally used in forming ceramic PTC elements. The molded shape is then subjected to a conventional heat treatment, either within the mold or after removal of the body from the mold, for sintering the titanate materials and for volatilizing and driving off the binder content of the molded shape, thereby to form a desired rigid ceramic body. In this regard, the term molding includes injection molding, pressing, slip casting and other conventional casting or forming procedures by means of which the body 18 is economically provided with the desired configuration as above described. As any of various conventional procedures are used in forming the resistor body 18 within the scope of this invention, the body forming process is not further described herein and it will be understood that the body is provided with the described passages and abutments in any conventional manner.

Figure 3:
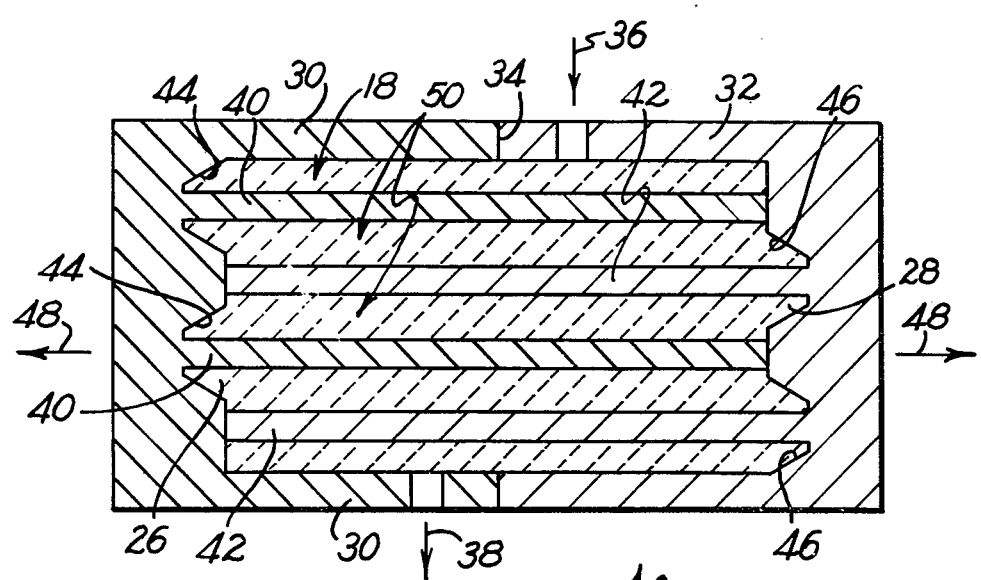
FIG. 3 is a section view along the central axis of a mold illustrating a typical procedure for making the resistor body shown in FIG. 2.

Preferably, as is best shown in FIG. 2, each of the resistor body passages 20 has a triangular, square or other rectilinear cross section so that a plurality of thin webs 50 of resistor material, best seen in FIG. 3, are defined within the body between adjacent body passages. Typically, for example, the resistor body has outer dimensions 0.6 centimeters of a side by 2.0 centimeters long and has sixteen passages arranged in a pattern of four rows of four passages each with each passage being of square cross section 0.1 centimeters on a side having webs 50 of a thickness of about 0.04 centimeters between adjacent passages. Note that, if desired, the body has a cylindrical outer configuration utilizing passages of a square cross section centrally grouped within the body.

Figure 4:
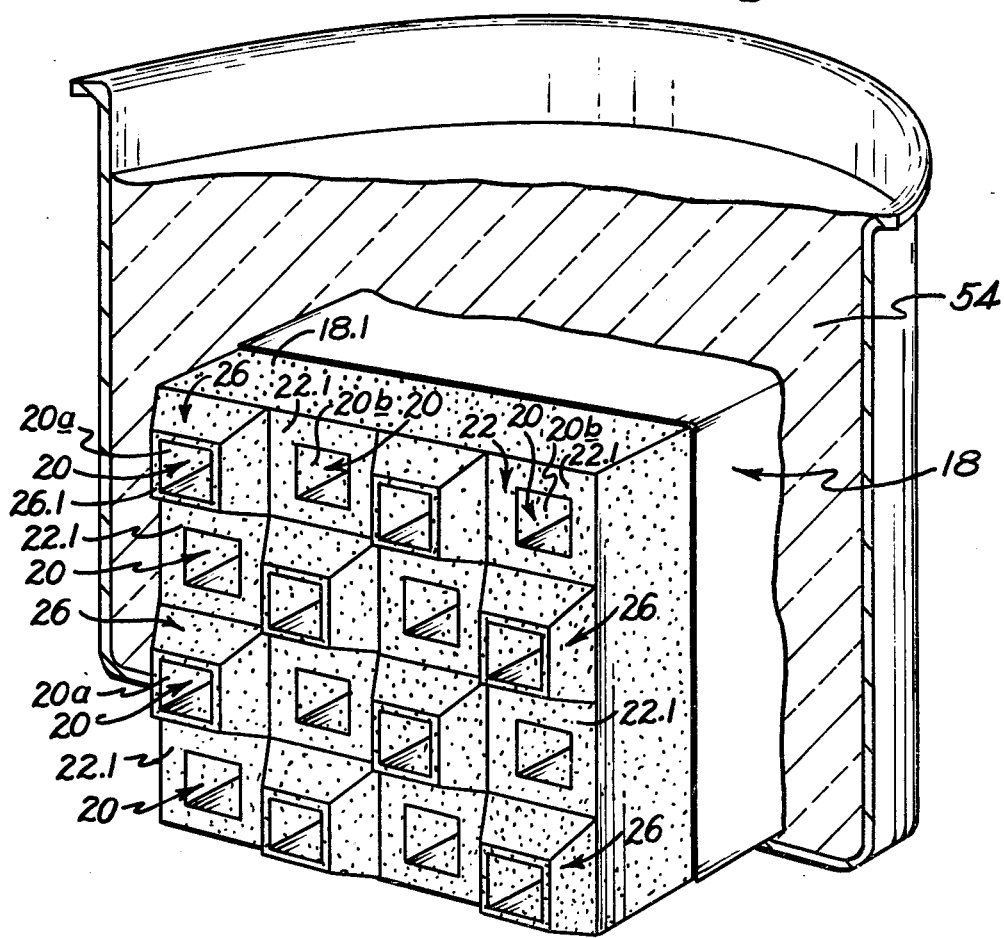
FIGS. 4 and 5 are perspective views similar to FIG. 2 diagrammatically illustrating steps in the method of FIG. 1.

After forming of the body 18, a band 52 of masking material is applied to the molded body extending circumferentially around the body between the opposite ends of the body as shown in FIG. 2. Preferably the band 52 leaves portions 18.1 of the body side surfaces unmasked adjacent each of the body ends 22 and 24. The partially masked resistor body is then immersed in a suitable coating bath diagrammatically illustrated at 54 in FIG. 4 in which all of the unmasked surfaces of the body including the inner walls of the passages 20, the body end surfaces 22 and 24, and the unmasked parts 18.1 of the body side surfaces are coated with an electrically conductive ohmic contact material 56 or other suitable contact material (see FIG. 6) while leaving the masked body surfaces free of the electrically conductive coating as is indicated in FIG. 4 by stippling of the coated body surfaces. Any of various well-known masking and ohmic contact materials commonly used in forming ohmic contacts on PTC resistor materials are used in forming the coatings 56 within the scope of this invention, the masking and coating materials being selected with respect to the resistor material and the desired masking and coating procedures in a conventional manner. That is, the masking material is selected so that the masking material is not coated in the coating bath 54, and so that it does not react in any undesired manner with either the resistor body material or the coating bath. The coating 56 is then selected to form the desired ohmic contact to the resistor material. Preferably, however, the masking material is also selected to be of an electrically insulating material so that the masking material is readily left on the resistor device after the coating of the body with the noted electrically conductive coatings is completed. Preferably also, the masking and electrically conductive coating materials are also selected for shielding the resistor material of the body 18 against substances which are chemically reactive with respect to the resistor material and which might tend to degrade the resistor material if brought into contact with the resistor device during use. Preferably, for example, the masking and coating materials are selected to be impervious to and chemically inert with respect to reducing atmospheres and substances which might react with and degrade PTC resistor materials. Typically, for example, where the resistor body 18 if formed of a ceramic titanate as above described, the masking of the body sides as indicated at 52 is accomplished by brush or spray coating of the body sides with a silicone rubber coating which is impervious to and chemically inert with respect to hydrocarbon fumes and liquids such as might degrade the titanate material by reduction thereof during use, such a masking material being adapted to be immersed in a conventional electroless nickel plating bath without contaminating the bath and being resistant to elevated temperatures during use of the resistor device. Similarly, the electrically conductive coating 56 is typically applied by immersing the partially masked resistor body in an electroless nickel plating bath comprising an aqueous solution of a nickel salt and a sodium hypophosphite after sensitization or activation of the unmasked surfaces by immersion of the body in a palladium chloride-stannous chloride solution in a conventional manner. In such a bath, nickel ions are catalytically reduced by the hypophosphite ions at the unmasked surfaces of the ceramic titanate for coating the unmasked body surfaces with a nickel metal which makes good ohmic contact to the ceramic titanate and which is impervious to and substantially inert with respect to reducing atmospheres such as hydrocarbon fumes and the like. Preferably, the coatings 56 initially formed on the resistor body surfaces are subjected to a heat treatment at about 250° to 300° C. for 15-60 minutes for securing the coatings in excellent ohmic contact relation to the ceramic titanate of the resistor body in a conventional way.

In a preferred embodiment of this invention, and particularly where the ohmic contact coating material 56 has been selected primarily in view of its ohmic contacting properties or in view of its property of being impervious to hydrogen-containing or other atmospheres and the like, it is desirable to apply a second electrically conductive metal coating to at least the side surface portions 18.1 of the resistor body, this second coating 58 (best shown in FIG. 6) being of a material such as silver, gold or other precious metal which displays low electrical surface contact resistance when pressed into engagement with an electrical terminal or contact. Such a second coating is typically applied to the resistor body by immersing the masked and initially coated body in a second coating bath such as a conventional silver plating bath or the like in the manner shown in FIG. 4. Preferably, however, to avoid unnecessary coating of the inner walls of the body passages with precious metal, the second coating is applied by dipping only the ends of the resistor body into such a second coating bath or by brush coating the ends of the resistor body, or only the side surface portions 18.1 of the body, with a conventional silver contact paste or the like in a conventional manner.

Figure 5:
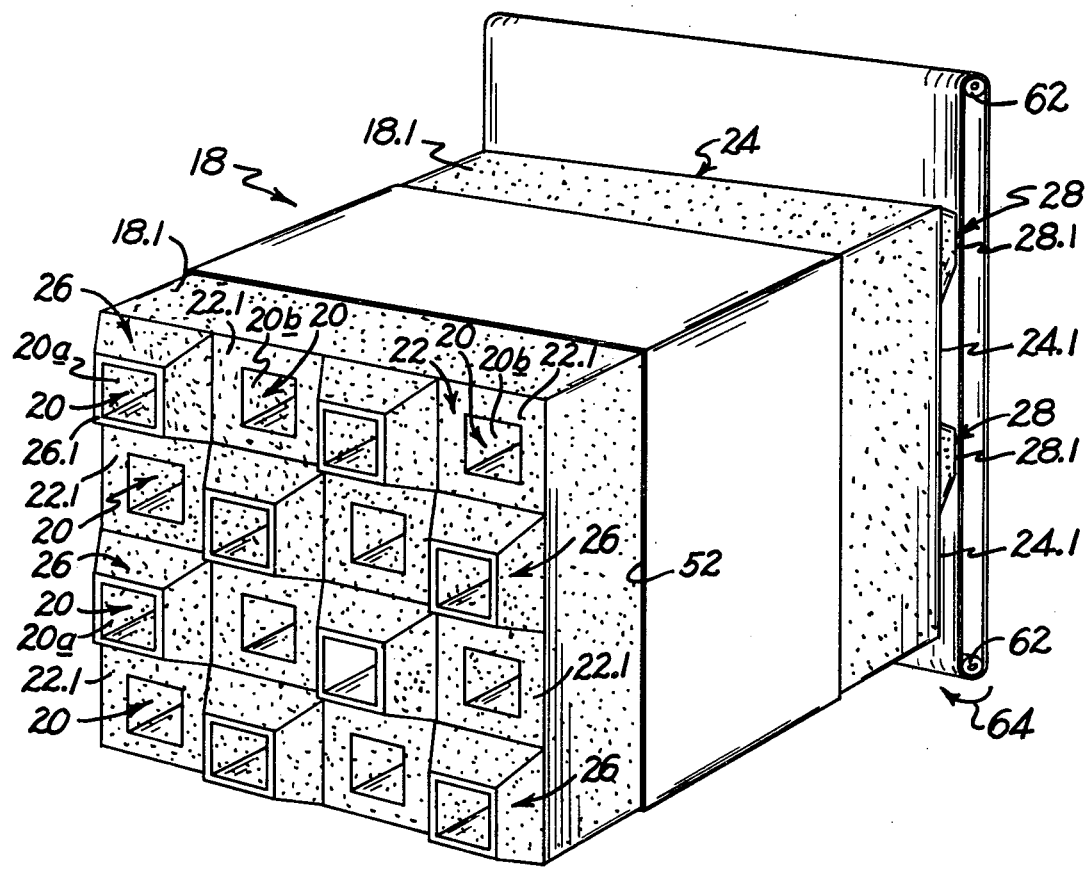
Figure 6:
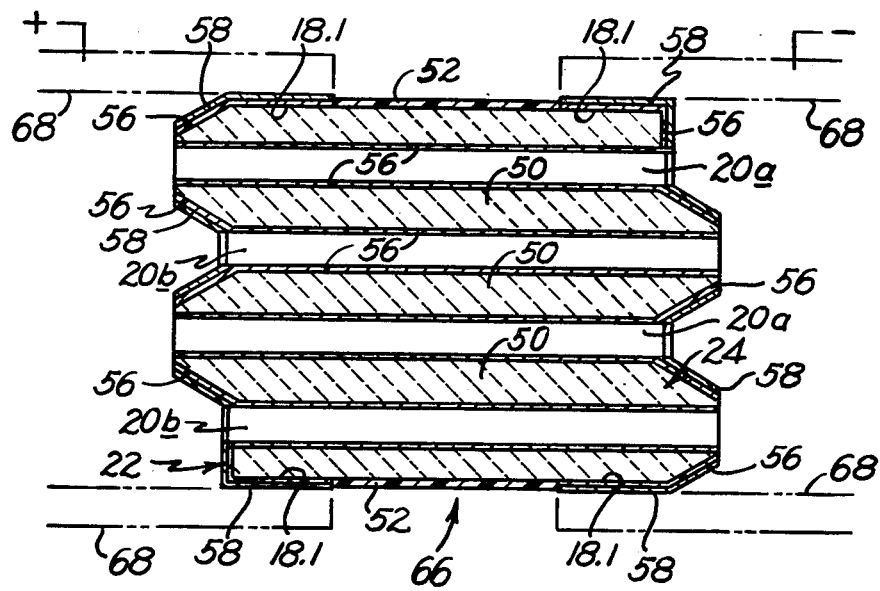
FIG. 6 is a section view along the central longitudinal axis of the improved resistor device of this invention.

Then, as is diagrammatically illustrated in FIG. 5, the coated resistor body is subjected to abrasion over the outer ends 26.1 and 28.1 of the body abutments for removing the ohmic contact coating material 56, and any low contact resistance coating material 58, from the outer ends of the abutments. Typically, for example, an abrasive belt 60 mounted on drive rolls 62 is driven in the direction indicated by arrow 64 in FIG. 5, thereby to remove coating material from the outer ends of the abutments (as is indicated in FIG. 5 by the omission of the stippling from the outer ends of the abutments). Where the abutment ends 26.1 and 28.1 are disposed in planes spaced from other portions 22.1 and 24.1 of the body end surfaces as described, coating material is easily removed from the abutment ends by such abrading. This leaves the electrically conductive coating material 56 on the body end surfaces 22 and 24 forming interconnection coatings or patterns electrically connected to the coatings on the body side surface portions 18.1 and to respective groups of the ohmic contact coatings within the body passages to form the improved resistor device 66 of this invention as shown in FIG. 6. Of course, other conventional abrading means or the like are also used within the scope of this invention for removing electrically conductive coating material from the outer ends of the body abutments.

In this way, as shown in FIG. 6, the resistor device 66 has an electrically conductive coating material 56 on the body surface 22 which electrically connects the ohmic contact coatings in the body passages 20b to each other and to the adjacent coated side surface portion 18.1 to serve as one device terminal. The coating 56 on the other body end surface 24 connects the coatings in passages 20a to each other and to the coating on the other body side surface portion 18.1 to serve as the second terminal of the device 66. The closely spaced abutments on the body end surfaces shield the portions of the coatings 56 interconnecting the ohmic contacts in the passages to protect the coatings from scratching or other injury during manufacture and use. Desirably also, where the low contact resistance coating 58 is used, this coating facilitates connection of the resistor device 66 in an electrical circuit by permitting ring-shaped terminals or the like indicated by the broken lines 68 in FIG. 6 to be conveniently connected to the resistor device terminals. Accordingly, when the device terminals are connected in an electrical circuit as indicated in FIG. 6, current is directed through thin webs 50 of the resistor body material between adjacent ohmic contacts in the body passages in the desired manner. Further, because substantially all of the surfaces of the resistor body are coated with masking material 52 or ohmic contact material 56 and because these materials are selected to be impervious to materials which might degrade the PTC material of the resistor body, the resistor device 66 is adapted to display a long service life even when used in environments which might otherwise be detrimental to the PTC resistor materials.

In this last regard, it will be understood that a wide variety of masking materials and ohmic contact coating materials are conventionally used in forming ohmic contacts on PTC resistor materials particularly including ceramic titanate resistor materials. Such ohmic contact materials typically include electroless nickel platings, molecular bonding aluminum inks; aluminum coatings prepared by deposition of aluminum powders from chromic ion solutions and the like which are commercially available in a variety of formulations from various sources. Such masking materials include silicone rubber film, tetrafluoroethylene film, polyimide films, polyvinyl films of various types and other polymer coatings formed by electromagnetic or ultraviolet polymerization of the like which are also available in various formulations from a variety of commercial sources. Many of such masking and ohmic contact coating materials are impervious to reducing atmospheres or are adapted to be impervious to and chemically inert with respect to various substances such as hydrocarbons and the like for shielding coated portions of PTC resistor materials against degradation when exposed to such substances. In accordance with this invention, however, the masking and ohmic contact materials applied to the resistor body 18 are both selected to protect the PTC material of the body against degradation when exposed to the same substance or substances and the masking and contact materials are applied to the body as above described so that substantially all of the surfaces of the resistor body are covered and protected with one or the other of the masking and contact materials. Preferably, for example, where the resistor body comprises a ceramic titanate material, the ohmic contact material comprises nickel and the masking material comprises a silicone rubber as above described, whereby the coating and masking materials are adapted to protect the ceramic titanate in the resistor device 66 against degradation upon exposure to hydrocarbons such as gasoline.

Figure 7:
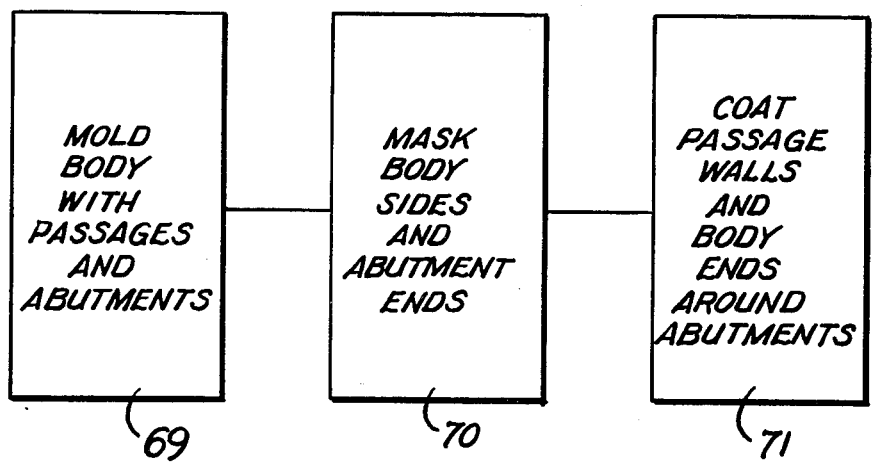
FIG. 7 is a block diagram illustrating another preferred embodiment of the method of this invention.

In another preferred embodiment of this invention, the method preferably comprises the steps as indicated in FIG. 7, those steps including forming the resistor body as indicated at 69 in FIG. 7, masking portions of the body including a band of side surface and the outer ends of the body abutments as indicated at 70 in FIG. 7, and the coating of the unmasked body surfaces with ohmic contact material as indicated at 71 in FIG. 7.

Figure 8:
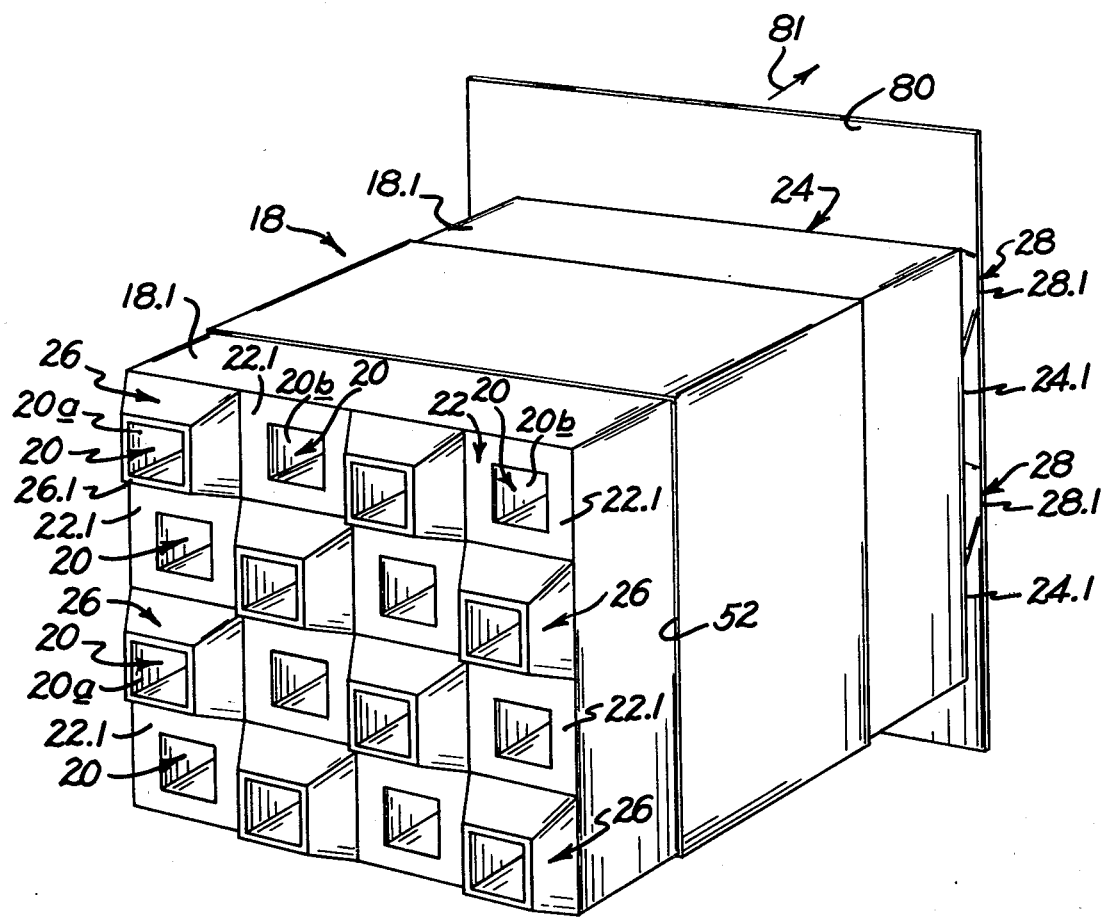
FIGS. 8 and 9 are perspective views similar to FIGS. 4-6 illustrating steps in the method of FIG. 7.
Figure 9:
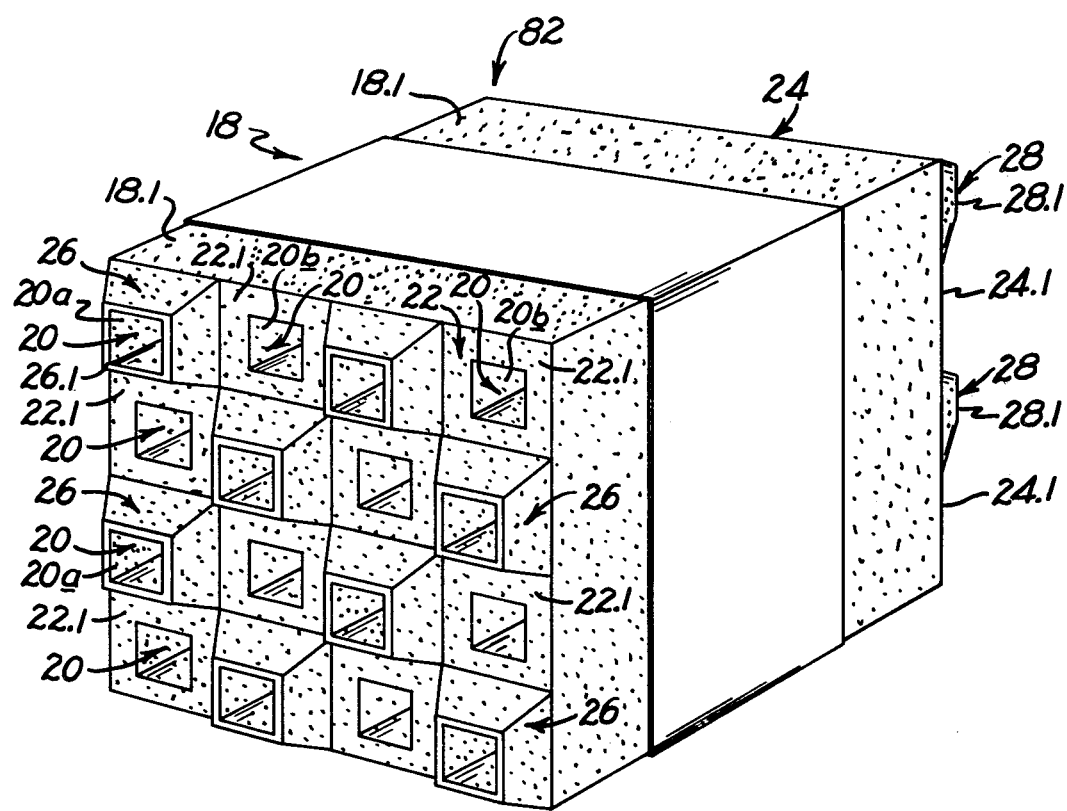

More specifically, in this alternate method of this invention, the resistor body 18 is formed in the manner previously described with reference to FIGS. 1-6. The molded body is then provided with a band of masking material 52 extending circumferentially around the sides of the body in the manner described above with reference to FIG. 2. In addition, in this alternate method, the masking material is also applied to the outer ends 26.1 and 28.1 of the resistor body abutments. For example, as is diagrammatically shown in FIG. 8, a transfer sheet 80 is touched against the groups of abutment ends at each of the resistor body ends, and is then withdrawn as indicated by the arrow 81 for transferring a layer of the masking material from the sheet to the outer ends of the abutments. Alternately, of course, any other conventional means are used for applying masking material to the outer ends of the body abutments, such techniques including dipping the ends of the abutments into a bath of masking material. The partially masked resistor body is then immersed in a coating bath corresponding to the bath 54 shown in FIG. 4 for coating all unmasked surfaces of the resistor body in the manner above described to form the resistor device 82 shown in FIG. 9. That is, the resistor device 82 is formed having ohmic contact material coating the inner walls of the resistor body passages, the end surfaces 22 and 24 of the resistor body omitting the masked outer end portions 26.1 and 28.1 of the body abutments, and the side surface portions 18.1 of the body as indicated by the stippling in FIG. 9. In this arrangement, the resistor device 82 is provided with substantially the same structure as the device 66 previously described without requiring an abrading step. In addition, where a protective masking material is selected, the ends of the body abutments are covered with masking material for fully protecting all parts of the resistor material in the device 82 against degradation in reducing environments and the like.

It should be understood that although preferred embodiments of the devices and methods of this invention have been described by way of illustration, this invention includes all modifications and equivalents thereof falling whithin the scope of the appended claims.

I claim:

1. A resistor device comprising a body of electrical resistor material of positive temperature coefficient of resistivity having a plurality of passages extending in a pattern in spaced side-by-side relation to each other through the body between opposite ends of the body defining a plurality of webs of the resistor material between the passages, having abutments of the resistor material extending around respective ends of alternate ones of the passages at one end of the body, and having abutments of the resistor material extending around respective ends of the others of said passages at the opposite end of the body, electrically conductive coatings on the inner walls of the passages in ohmic contact relation to the resistor material, an electrically conductive coating on said one end of the body extending around the abutments at said one end of the body electrically interconnecting the contact coatings in said other passages at said one end of the body, and an electrically conductive coating on said opposite end of the body extending around the abutments at said opposite end of the body electrically interconnecting the contact coatings in said alternate body passages at said opposite end of the body, whereby, when the interconnection coatings are connected to respective power source terminals, current is directed through the webs of resistor material between the contact coatings in said alternate passages and the contact coatings in said other passages.

2. A resistor device as set forth in claim 1 having an electrically conductive terminal coating on the side of the body adjacent each end of the body, said terminal coatings being spaced from each other and each being electrically connected to the interconnection coating on the body end adjacent thereto for facilitating electrical connection of the resistor device in an electrical circuit.

3. A resistor device as set forth in claim 2 wherein each of said terminal coatings extends circumferentially around the body.

4. A resistor device as set forth in claim 2 wherein each of the terminal coatings has a surface layer of a metal of relatively lower surface contact resistance than said ohmic contact coating material.

5. A resistor device as set forth in claim 1 having additional coating means of electrically insulating material on the body cooperating with the electrically conductive coatings on the body for shielding the resistor material against a substance chemically reactive with the resistor material.

6. A resistor device as set forth in claim 5 wherein said additional coating means cooperates with the electrically conductive coatings on the body for covering substantially all surfaces of the body.

7. A resistor device as set forth in claim 6 wherein said resistor body material comprises a doped ceramic titanate material and said electrically conductive coatings comprise nickel metal for shielding the resistor material against hydrogen-containing substances reactive with the titanate material.

8. A resistor device as set forth in claim 7 wherein said additional coating means comprises silicone rubber.

9. A resistor device comprising a body of a doped ceramic titanate material of positive temperature coeficient of resistivity which displays a sharp, anomolous increase in resistivity when heated to a selected temperature, said body having a plurality of passages extending in a pattern in spaced side-by-side parallel relation to each other through the body between opposite ends of the body defining a plurality of webs of the titanate material between the passages, said body having parapets with tops thereof standing out from one end of the body extending around respective ends of alternate ones of the passages at said one end of the body and having parapets with tops thereof standing out from the opposite end of the body extending around respective ends of the others of said passages at said opposite end of the body, electrically conductive coatings on the inner walls of the passages in ohmic contact relation to the titanate material, an electrically conductive interconnection coating on said one end of the body extending around the parapets at said one end of the body electrically connected to the ohmic contact coatings in said other passages in the body at said one end of the body and spaced from the ohmic contact coatings in said alternate passages in the body by the tops of the parapets at said one end of the body, an electrically conductive interconnection coating on said opposite end of the body extending around the parapets at said opposite end of the body electrically connected to the ohmic contact coatings in said alternate passages in the body at said opposite end of the body and spaced from the ohmic contact coatings in said other passages in the body by the tops of the parapets at said opposite end of the body, and an electrically conductive terminal coating on the side of the body extending circumferentially around the body adjacent each of the ends of the body, said terminal coatings being spaced from each other and each being electrically connected to the interconnection coating on the body end adjacent thereto.

10. A resistor device as set forth in claim 9 having additional coating means of electrically insulating material on said body covering side surfaces of the body between said terminal coatings.

11. A resistor device as set forth in claim 10 having said additional coating means further covering the tops of said parapets at each end of the resistor body.

12. A resistor device as set forth in claim 9 wherein each of said terminal coatings has a surface layer of a precious metal material of relatively lower surface contact resistance than said ohmic contact coating material.

* * * * *